United States Patent [19]

Canivenc et al.

[11] Patent Number: 5,053,290

[45] Date of Patent: Oct. 1, 1991

[54] DIORGANOPOLYSILOXANES COMPRISING BENZALMALONATE FUNCTIONAL GROUPS

[75] Inventors: Edith Canivenc, Lyons; Serge Forestier, Claye-Souilly; Michel Gay, Lyons; Gérard Lang, Saint-Gratien; Hervé Richard, Paris, all of France

[73] Assignee: Rhone-Poulenc Chimie, Courbevoie, France

[21] Appl. No.: 405,299

[22] Filed: Sep. 11, 1989

[30] Foreign Application Priority Data

Sep. 9, 1988 [FR] France ............................. 88 12016

[51] Int. Cl.$^5$ .............................................. B32B 9/00
[52] U.S. Cl. ..................................... 428/429; 428/447; 528/15; 528/26; 528/31; 556/437; 556/439; 556/441; 556/479
[58] Field of Search ........................ 528/26, 15, 31; 556/439, 437, 479, 441; 428/429, 447

[56] References Cited

U.S. PATENT DOCUMENTS

| 4,405,469 | 9/1983 | Hafner et al. | 252/28 |
| 4,808,649 | 2/1990 | Gay et al. | 528/26 |
| 4,940,765 | 7/1990 | Canivenc et al. | 556/479 |

*Primary Examiner*—Melvyn I. Marquis
*Attorney, Agent, or Firm*—Burns, Doane, Swecker & Mathis

[57] ABSTRACT

Novel diorganopolysiloxanes containing benzalmalonate functional groups, well adapted as coatings for optical fibers, as well as lubricants for plastic substrates, e.g., PVC substrates, have one of the following formulae:

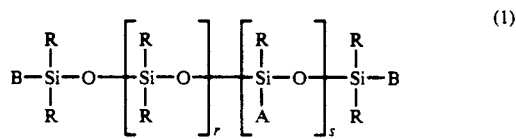

(1)

or

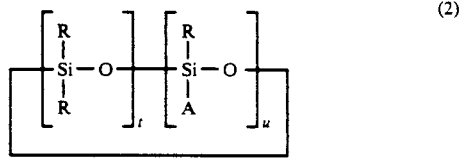

(2)

in which A and/or B is a benzalmalonate radical.

10 Claims, No Drawings

DIORGANOPOLYSILOXANES COMPRISING BENZALMALONATE FUNCTIONAL GROUPS

BACKGROUND OF THE INVENTION

1. Field of the Invention

The present invention relates to novel diorganopolysiloxanes comprising benzalmalonate functional groups.

2. Description of the Prior Art

It is known to this art to modify diorganopolysiloxanes, whether along the polymer backbone and/or at the end of a polymer chain, by incorporating various organic functional groups therein, with a view towards imparting specific properties to such silicone polymers.

A convenient technique for introducing these organic functional groups is to carry out a hydrosilylation reaction between a diorganopolysiloxane bearing at least one SiH group and an ethylenically unsaturated organic compound bearing in the presence of a catalytically effective amount of a catalyst containing platinum.

Exemplary of such prior art are:

(i) U.S. Pat. Nos. 2,970,150 and 4,160,775, describing the addition of allyl or methallyl alcohol to a silane or diorganopolysiloxane bearing at least one SiH group;

(ii) U.S. Pat. Nos. 3,767,690 and 4,503,208, describing diorganopolysiloxanes bearing groups containing an acrylate or methacrylate functional group;

(iii) U.S. Pat. No. 4,640,967, describing diorganopolysiloxanes bearing an epoxy and/or acrylate or methacrylate group and their use as compositions for coating optical fibers;

(iv) Patent EP-A-0,088,842, describing diorganopolysiloxanes bearing benzophenone groups;

(v) U.S. Pat. Nos. 4,316,033 and 4,373,060 describe alkoxysilanes bearing a benzotriazole functional group F. These patents describe the cohydrolysis of these functional silanes with colloidal silica and an alkyltrialkoxysilane to prepare a silicone resin, namely, a polymer essentially consisting of the units $Q(SiO_2)$, $T(CH_3SiO_{1.5})$ and less than 2 mole % of $FSiO_{1.5}$. This silicone resin, cured, is employed as a coating for surfaces made of plastic; and (vi) U.S. Pat. Nos. 4,404,257, 4,242,381 and 4,242,383 describe polycarbonate compositions containing organic benzylidenemalonate derivatives.

Nonetheless, these patents neither describe nor suggest the preparation of linear or cyclic diorganopolysiloxanes containing a benzylidenemalonate functional group.

SUMMARY OF THE INVENTION

A major object of the present invention is the provision of novel diorganopolysiloxanes modified with particular organic functional groups which, on the one hand, have a high refractive index, with a view to their incorporation into coating compositions for optical fibers, and, on the other, are well suited as lubricants for plastics, in particular for PVC.

Briefly, the present invention features novel modified diorganopolysiloxane polymers having the formula:

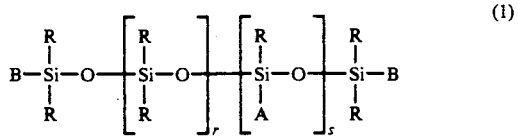

in which the symbols R, which may be identical or different, are each a $C_1$-$C_{10}$ alkyl, phenyl or 3,3,3-trifluoropropyl radical, at least 80% of the number of the R radicals being methyl radicals; the symbols B, which may be identical or different, are each a radical R or a radical A; r is an integer ranging from 0 to 200, inclusive; s is an integer ranging from 0 to 50, inclusive, with the proviso that if s is 0, at least one of the two symbols B is an A radical; or having the formula:

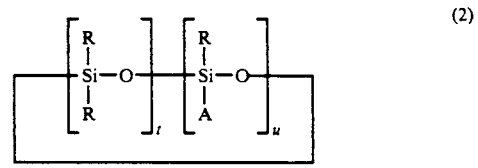

in which R is as defined in formula (1); u is an integer ranging from 1 to 20, inclusive; t is an integer ranging from 0 to 20, inclusive; t+u is equal to or greater than 3; and in which formulae (1) and (2), A is a radical of the formula:

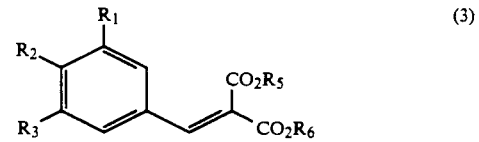

in which $R_1$ and $R_2$ are each a hydrogen atom, a hydroxyl radical, a trimethylsiloxy radical, a $C_1$-$C_6$ alkyl radical, a $C_1$-$C_6$ alkoxy radical or a divalent radical Y of the formula:

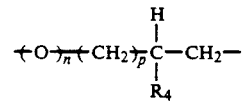

in which n is 0 or 1; p is an integer ranging from 1 to 10, inclusive, preferably ranging from 1 to 4; and $R_4$ is a hydrogen atom or a $C_1$-$C_4$ alkyl radical, with the proviso that one of the two radicals $R_1$ and $R_2$ necessarily is the radical Y; $R_3$ is a hydrogen atom, a $C_1$-$C_6$ alkyl radical or a $C_1$-$C_6$ alkoxy radical; and $R_5$ and $R_6$, which may be identical or different, are each a $C_1$-$C_8$ alkyl radical.

DETAILED DESCRIPTION OF THE PREFERRED EMBODIMENTS OF THE INVENTION

More particularly according to the present invention, in the above formulae (1) and (2) the alkyl and alkoxy radicals may either be linear or branched chain.

Exemplary of the $C_1$-$C_6$ alkoxy radicals comprising either a straight or branched chain are methoxy, ethoxy, n-propoxy, isopropoxy, n-butoxy, isobutoxy, tertbutoxy, n-amyloxy, isoamyloxy, neopentyloxy and n-hexyloxy radicals.

Exemplary of the $C_1-C_6$ alkyl radicals comprising either a straight or branched chain, particularly representative are methyl, ethyl, n-propyl, isopropyl, n-butyl, isobutyl, tert-butyl, n-amyl, isoamyl, neopentyl and n-hexyl radicals, and exemplary of the $C_1-C_8$ alkyl radicals are the above $C_1-C_6$ radicals, as well as the n-heptyl, n-octyl and 2-ethylhexyl radicals.

The preferred alkyl radicals R are methyl, ethyl, propyl, n-butyl, n-octyl and 2-ethylhexyl radicals. At least 80% of the number of the R radicals are preferably methyl radicals.

Particularly preferred are random or block polymers of formulae (1) and (2) exhibiting at least one of the following characteristics:
R is methyl;
B is methyl;
$R_1$ is H or Y;
$R_2$ is Y, methoxy or butoxy;
$R_3$ is H or methoxy;
p=1;
$R_4$ is H or methyl;
$R_5$ and $R_6$ are ethyl or 2-ethylhexyl;
r ranges from 5 to 20, inclusive;
s ranges from 2 to 15, inclusive;
t+u ranges from 3 to 10, inclusive.

To prepare the polymers of formulae (1) and (2) it is convenient, for example, to use the corresponding polymer in which all the A radicals are hydrogen atoms as the starting material.

This polymer is referred to as an SiH polymer in the description that follows; the SiH groups may be present along the polymer chain and/or at polymer chain ends. These SiH polymers are materials which are well known to the silicone art and are generally available commercially.

They are described, for example, in U.S. Pat. Nos. 3,220,972, 3,436,366, 3,697,473 and 4,340,709.

This SiH polymer can, therefore, be selected from among those of the formula:

$$B'-\underset{\underset{R}{|}}{\overset{\overset{R}{|}}{Si}}-O\left[\underset{\underset{R}{|}}{\overset{\overset{R}{|}}{Si}}-O\right]_r\left[\underset{\underset{H}{|}}{\overset{\overset{R}{|}}{Si}}-O\right]_s\underset{\underset{R}{|}}{\overset{\overset{R}{|}}{Si}}-B' \quad (4)$$

in which R, r and s are as defined above for formula (1) and the radicals B', which may be identical or different, are each a radical R or a hydrogen atom, or those of formula:

$$\left[\underset{\underset{R}{|}}{\overset{\overset{R}{|}}{Si}}-O\right]_t\left[\underset{\underset{H}{|}}{\overset{\overset{R}{|}}{Si}}-O\right]_u \quad (5)$$

in which R, t and u are as defined above for formula (2).

A hydrosilylation reaction is carried out between this SiH polymer of formulae (4) or (5) in the presence of a catalytically effective amount of a platinum catalyst and an organic benzalmalonate derivative selected from among those of the formula:

$$\text{(I)}$$

in which $R_1$, $R_2$, $R_3$, $R_5$ and $R_6$ are as defined above for formula (3), except that the radical Y is then the monovalent unsaturated homologous radical Y' of the formula:

$$+O)_n(CH_2)_p\underset{\underset{R_4}{|}}{C}=CH_2$$

in which n, p and $R_4$ are as defined above for formula (3).

Certain of the derivatives of formula (I), in which n=1, are described in the chemical literature, in particular in *J. Chem. Soc. Perkin Trans.*, (I), pages 1,627–1,635 (1985) and in *Chem. Ber.*, Vol. 99, pages 1,962–1,965.

In general, the derivatives of formula (I) may be prepared by a Knoevenagel reaction, namely, the condensation of an aromatic aldehyde (II) with a malonic acid diester of formula (III) in toluene, in the presence of piperidinium acetate as a catalyst. The water is removed azeotropically. The reaction scheme is as follows:

(II) + (III) $\xrightarrow[(-H_2O)]{\text{Piperidinium acetate} \atop \text{Toluene}}$ (I)

wherein $R_1$, $R_2$, $R_3$, $R_5$ and $R_6$ are as defined above for formula (I).

The products are recrystallized, distilled or separated by column chromatography. The aldehydes of formula (II), which are known compounds, may be prepared according to one of the following methods:

First method

The aldehyde of formula (II), in which $R_1$ is a $-(CH_2)_p-\overset{\cdot}{C}(R_4)=CH_2$ radical when p=1, $R_2$ is a hydroxyl radical and $R_3$ is as defined above, may be prepared by a Claisen rearrangement of an aldehyde of formula (IV) according to the following reaction scheme:

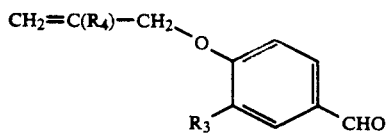

(IV)

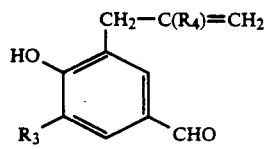

(IIA)

This rearrangement may be carried out under the conditions described by Tarbell (*Organic Reactions,* Vol. 2, page 1, John Wiley, New York (1944)) by heating the compound of formula (IV) to at least approximately 170° C., optionally in the presence of a solvent.

The aldehyde of formula (IV) may be prepared by reacting an alkenyl halide of formula (V) with an aldehyde of formula (VI):

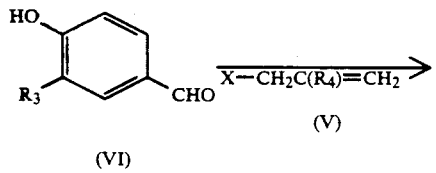

(VI)  (V)

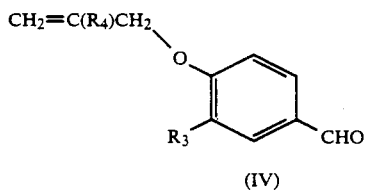

(IV)

This reaction is carried out in the presence of a base, in a solvent, for example in the presence of an alkali metal carbonate in dimethylformamide, at a temperature ranging from ambient temperature to the boiling point of the solvent. The aldehyde of formula (VI) can be prepared by known methods. In the compound of formula (V), X is a halogen atom, preferably a chlorine or bromine atom.

Second method

The aldehyde of formula (IIB), corresponding to the formula (II) in which $R_1$ is a $-(CH_2)_p-C(R_4)=CH_2$ radical when p=1, $R_2$ is a $C_1-C_6$ alkoxy radical and $R_3$ is as defined above, may be prepared according to either of the two routes below:

First route

By formylation of a phenol ether of formula (VII) according to the following reaction scheme:

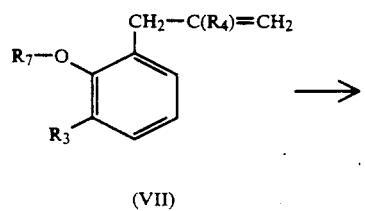

(VII)

-continued

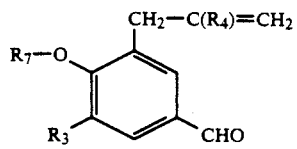

(IIB)

wherein $R_7$ is a $C_1-C_6$ alkyl radical, and $R_3$ is as defined above.

This reaction is carried out, for example, by the addition of the complexes formed by the action of phosphorus oxychloride on disubstituted formamides according to Vilsmeier and Haack (Ber., 60, page 119 (1927)), to the compounds of formula (VII).

The phenol ether (VII) may be prepared by known techniques.

Second route

The compound of formula ($II_A$) obtained by the first method may be converted into a compound of formula ($II_B$) by reaction with a $C_1-C_6$ alkyl halide or sulfate in the presence of a base, for example in the presence of an alkali metal carbonate, in a solvent such as dimethylformamide, or else in the presence of an alkali metal hydride in 1,2-dimethoxyethane, according to the following reaction scheme:

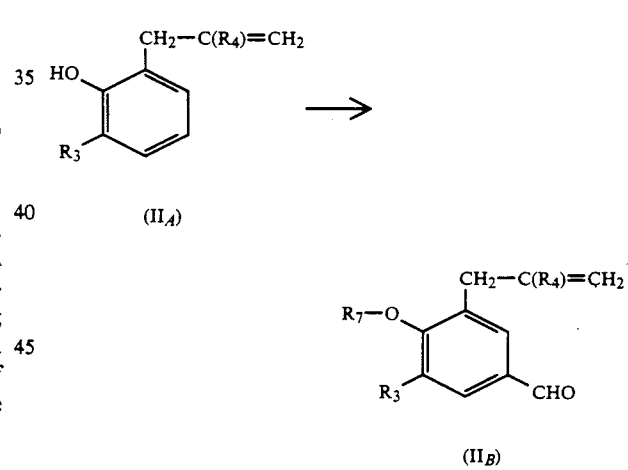

($II_A$)

($II_B$)

Third method

The aldehyde of formula (II), in which $R_1$ or $R_2$ is a $-(CH_2)_p-C(R_4)=CH_2$ radical and $R_3$ is a hydrogen atom, a $C_1-C_6$ alkyl radical or a $C_1-C_6$ alkoxy radical, can also be prepared by the reaction of ethyl orthoformate with a phenylmagnesium bromide of formula (VIII), followed by a hydrolysis of the acetal formed:

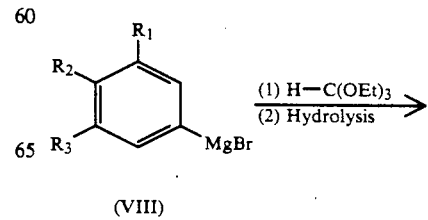

(VIII)

-continued

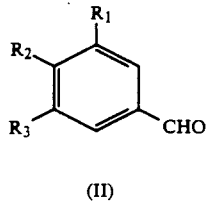

(II)

This reaction may be carried out under the conditions described by Quelet (*C.R. Acad. Sci.*, Vol. 182, page 1,285 and *Bull. Soc. Chim. Fr.*, Vol. 45, page 267)), for example in an inert solvent such as ethyl ether, dioxane or 1,2-dimethoxyethane, at a temperature ranging from ambient temperature to the boiling point of the solvent. In the compounds of formulae (II) and (VIII), one of the substituents $R_1$ or $R_2$ is a —$(CH_2)_p$—$C(R_4)$=$CH_2$ radical, $R_4$ and p are as defined above, and the other is a hydrogen atom, a $C_1$-$C_6$ alkyl radical or a $C_1$-$C_6$ alkoxy radical, and $R_3$ is a hydrogen atom, a $C_1$-$C_6$ alkyl radical or a $C_1$-$C_6$ alkoxy radical.

The platinum catalysts employed to carry out the hydrosilylation reaction between the polymers of formulae (4) or (5) with the organic derivative of formula (I) are extensively described in the literature. Exemplary are, in particular, the complexes of platinum and of an organic product described in U.S. Pat. Nos. 3,159,601, 3,159,602 and 3,220,972 and European Patents EP-A-57,459, EP-A-188,978 and EP-A-190,530, and the complexes of platinum and vinylated organopolysiloxanes which are described in U.S. Pat. Nos. 3,419,593, 3,377,432 and 3,814,730.

To effect reaction between the SiH polymer of formulae (4) or (5) react with the derivative of formula (I), an amount of platinum catalyst is typically used, calculated as the weight of platinum metal, ranging from 5 to 600 ppm, preferably from 10 to 200 ppm, based on the weight of SiH polymer of formulae (4) or (5).

The hydrosilylation reaction can be carried out in bulk, or in a volatile organic solvent such as toluene, heptane, xylene, tetrahydrofuran and tetrachloroethylene.

It is generally desirable to heat the reaction mixture to a temperature ranging from 60° to 120° C. for the time required to complete the reaction. Furthermore, the SiH polymer can be added dropwise to the derivative of formula (I) in solution in an organic solvent, or else the SiH polymer and the derivative of formula (I) can be added simultaneously to a catalyst suspension in the solvent.

It is recommended to monitor whether or not the reaction is complete by determining the residual SiH groups using alcoholic potassium hydroxide, and the solvent is then removed, for example by distillation under reduced pressure.

The crude oil obtained may be purified, for example, by passing same through an absorbent column of silica.

The polymers of formula (1) and (2) have a remarkably high refractive index. They can therefore be employed, in particular mixed with the organic or organosilicon compositions used for coating optical fibers, in the case where a coating of high refractive index is desired.

Furthermore, the polymers of formulae (1) or (2) are very well suited as lubricants for various plastics such as polyolefins, polyesters and especially PVC (polyvinyl chloride). Thus, they can be used to prevent such plastics from adhering to processing tools and machines.

For this latter application, from 0.001 to 3 parts by weight of polymer are incorporated per 100 parts by weight of plastic before it is processed.

In order to further illustrate the present invention and the advantages thereof, the following specific examples are given, it being understood that same are intended only as illustrative and in nowise limitative.

EXAMPLE 1

Preparation of the random polymer of the formula

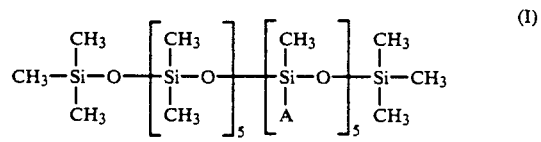

wherein A is the radical:

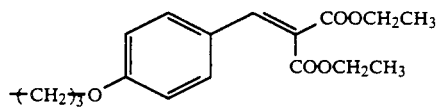

A solution in toluene (55 ml) of 30 g of diethyl 4-allyloxybenzylidenemalonate and 16 g of the random polymer of the above formula, where A was a hydrogen atom, was added dropwise over one hour, 30 minutes, to a suspension of platinum on charcoal at a concentration of 5% (166 mg) in dry toluene (5 ml) at 90°-100° C. under nitrogen and with stirring, while the temperature was maintained between 100° and 105° C.

Stirring and refluxing were continued until the SiH groups had disappeared (absence of a band at 2,180 cm$^{-1}$ in the infrared), namely, 10 hours. The mixture was filtered through paper, the solvent was removed and the residue was washed twice with 80% ethanol. The oil obtained was taken up in chloroform, was dried over sodium sulfate and was filtered through Celite to remove the residues of colloidal platinum. After evaporating off the solvent, a pale yellow oil was obtained—weight: 36 g, yield: 78%.

UV spectrum (ethanol) : λ max: 311 nm.

Analysis by nuclear magnetic resonance ($^1$H and $^{29}$Si NMR) evidenced that the product did have the desired structure.

EXAMPLE 2

Preparation of the random polymer of the formula

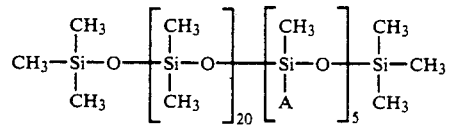

wherein A is the radical:

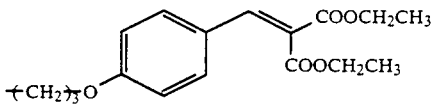

The operating procedure of Example 1 was repeated, starting with the random polymer of the above formula, where A was a hydrogen atom.

A viscous yellow oil was obtained.

UV spectrum (CHCl$_3$): λ max=313 nm.

EXAMPLE 3

Preparation of the random polymer of the formula

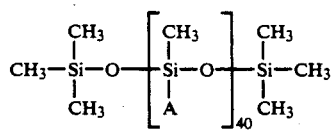

wherein A is the radical:

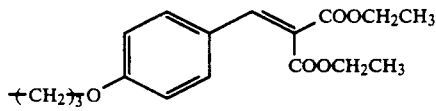

The operating procedure of Example 1 was repeated, starting with the random polymer of the above formula where A was a hydrogen atom.

A slightly yellow oil was thus obtained.

UV spectrum (CHCl$_3$): λ max=313 nm.

EXAMPLE 4

Preparation of the random polymer of the formula

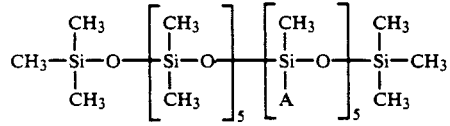

where A is the radical:

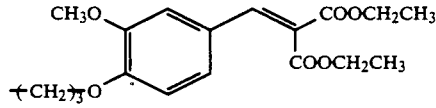

The operating procedure of Example 1 was repeated, except that the starting materials were 20 g of diethyl 4-allyloxy-3-methoxybenzylidenemalonate and 9.7 g of the random polymer of the above formula where A was a hydrogen atom.

22 g of a thick, pale yellow oil were obtained (yield: 74%).

UV spectrum (CHCl$_3$): λ max=330 nm;

λ max=300 nm (shoulder).

Nuclear magnetic resonance analysis ($^1$H and $^{29}$Si) evidenced that the product obtained did have the desired structure.

EXAMPLE 5

Preparation of the random polymer of the formula

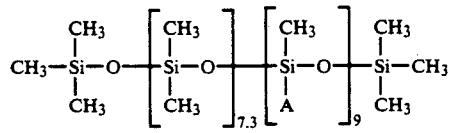

wherein A is the radical:

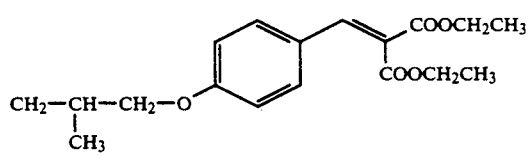

Into a three-necked round-bottom flask maintained at 100° C. by means of an oil bath fitted with magnetic stirring and a vertical condenser were charged: 22.7 g (0.071 mole) of diethyl 4-methallyloxybenzylidenemalonate, 33 g of toluene and 14.4 μl of a hexane solution (at a concentration of 8.45% by weight of platinum metal) of a platinum complex prepared from chloroplatinic acid and from 1,3-divinyl-1,1,3,3-tetramethyldisiloxane, as described in U.S. Pat. No. 3,814,730.

10 g of the random polymer of the above formula, where A was a hydrogen atom, determined by analysis to contain 713 meq/100 g of SiH functional group (meq=milliequivalent), were added over one hour.

At the end of 24 hours of reaction, a check was made by means of butanolic potassium hydroxide by determining the SiH groups, that the degree of conversion of the SiH functional groups was 73%.

A cloudy, slightly yellow oil, with a pleasant odor and very highly viscous, was then obtained, after the toluene had been removed by distillation at 100° C. at a reduced pressure of 0.66 kPa.

A proton nuclear magnetic resonance (H NMR) analysis was carried out at 360MHz in CDCl$_3$ on a sample of oil obtained, which evidenced the existence of unreacted monomer, of hydrosilane, and of the structure resulting from hydrosilylation of the methallyloxy unsaturation of the monomer, namely:

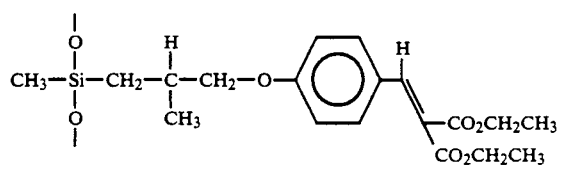

EXAMPLE 6

Example 6a diethyl 3-allyl-4-methoxybenzalmalonate

Preparation of a compound of the general formula (I) in which R$_1$ is the radical —CH$_2$—CH=CH$_2$, R is the radical —OCH$_3$, R$_3$ is a hydrogen atom, and R$_5$ and R$_6$ are each the radical —C$_2$H$_5$:

First stage

Preparation of 3-allyl-4-methoxybenzaldehyde

First method 50 g (0.308 mole) of 4-allyloxybenzaldehyde were heated for 4 hours under nitrogen with stirring at 220° C. The cooled reaction mixture was taken up in dichloromethane and extracted with 5N sodium hydroxide. The aqueous phase was acidified with 6N hydrochloric acid and was extracted with dichloromethane. The organic phase was dried and the solvent was evaporated off to give a black brown oil. After vacuum distillation, the fraction of b.p.=138°-140° C. at 106 Pa (15 g, yield=30%) was collected, consisting of 3-allyl-4-hydroxybenzaldehyde (white powder, m.p.=66° C.)

The above derivative (14.5 g, 0.089 mole) 30 ml of N,N-dimethylformamide, 13.6 g (0.098 mole) of anhydrous potassium carbonate and 11 ml (0.178 mole) of methyl iodide were introduced in succession. The entire mass was heated to 60°-70° C. for 3 hours. The reaction mixture was poured into iced water and then entirely extracted with diisopropyl ether. The organic phase was dried over sodium sulfate, was filtered, and the solvent was evaporated off to obtain 3-allyl-4-methoxybenzaldehyde (pale yellow oil, 13.6 g, yield=87%).

Second method

2-Allylphenol (100 g, 0.75 mol), 2 liters of dry N,N-dimethylformamide and anhydrous potassium carbonate (206 g, 1.49 moles) were introduced in succession into a 5-liter reactor. Methyl iodide (92 ml, 1.49 moles) was introduced dropwise at ambient temperature. The materials were maintained for 4 hours at 38° C. The reaction mixture was poured into iced water and was extracted with dichloromethane. The organic phase was washed with water and was dried. After evaporation of the solvent and vacuum distillation, 2-allylanisole was recovered as a fraction distilling at 110° C. at 5,000 Pa (colorless liquid, 46 g, yield=42%).

N,N-dimethylformamide (75 ml, 0.98 mol) was placed in a 500-ml reactor and phosphorus oxychloride (26 ml, 0.28 mole) was added while cooling to about 5° C. The mixture was maintained at 10° C. for one hour and the preceding derivative (41.5 g, 0.28 mole) was introduced dropwise. The temperature was raised progressively to 100° C. over one hour and the reaction mixture was maintained at this temperature for 10 hours. The cooled mixture was poured into iced water and was extracted with diisopropyl ether. The organic phases were washed with water, were dried over sodium sulfate, were filtered, and the solvent was evaporated off to give a crude product (31 g), which was purified by chromatography on silica 60 (eluent: 50/50 toluene/hexane) to give a fraction (4.5 g) of 3-allyl-4-methoxybenzaldehyde identical with that obtained by the first method.

Second stage

Preparation of diethyl 3-allyl-4-methoxybenzalmalonate

A mixture of the preceding derivative (10 g, 0.057 mole), of diethyl malonate (9.09 g, 0.057 mole), of toluene (15 ml), of acetic acid (0.36 ml) and of piperidine (0.68 ml) was heated at reflux, under nitrogen with a Dean Stark. After 5 hours of heating, 1 ml of water had been collected. After cooling, the toluene phase was washed with water, was dried, and the solvent was distilled off. An orange-colored oil was obtained, which crystallized. It was recrystallized from diisopropyl ether with animal charcoal treatment. White crystals of diethyl 3-allyl-4-methoxybenzalmalonate (12.7 g, yield=70%) were obtained, which had the following characteristics:

(i) melting point: 69° C., (ii) $^1$H NMR spectrum (CDCl) spectrum consistent with the expected structure, (iii) UV spectrum (CHCl$_3$): λ max: 318 nm; ε: 14450;

(iv) elemental analysis: calculated: C 67.91, H 6.97, O 25.13; found: C 68.04, H 6.89, O 25.23.

Example 6b

Preparation of the random polymer of the formula

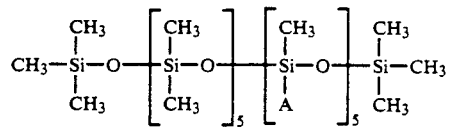

wherein A is the radical:

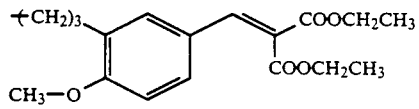

A toluene (20 ml) solution of diethyl 3-allyl-4-methoxybenzalmalonate (10 g, 31.4 meq) and of the random polymer of the above formula where A was a hydrogen atom (4.60 g, 31.4 meq of SiH) was added dropwise over one hour, thirty minutes, under nitrogen and with stirring, to a suspension of platinum on charcoal at a concentration of 5% (55 mg) in dry toluene (5 ml) at 90°-100° C., while the temperature was maintained between 100° and 105° C. Stirring and refluxing were continued until the SiH groups had disappeared (absence of a band at 2,180 cm$^{-1}$ in the infrared), namely, 8 hours. The mixture was filtered through paper, the solvent was removed and the residue was washed twice with 80% ethanol. The pale yellow oil obtained was taken up in dichloromethane, was dried over sodium sulfate and was passed through a bed of silica 60. After evaporating off the solvent, a viscous pale yellow oil was obtained (5.3 g, yield=36%).

(i) $^1$H NMR spectrum (CDCl$_3$): spectrum consistent with the formula, (ii) $^{29}$Si NMR spectrum (CDCl$_3$): spectrum consistent with the formula, (iii) UV spectrum (CHCl$_3$): λ max: 318 rm.

EXAMPLE 7

Example 7a diethyl 3-allyl-4,5-dimethoxybenzalmalonate

Preparation of a compound of general formula (I) in which R$_1$ is the radical —CH$_2$—CH=CH$_2$, R$_2$ and R$_3$ are each the radical —OCH$_3$ and R$_5$ and R$_6$ are each the radical —C$_2$H$_5$.

First stage

4-Allyloxy-3-methoxybenzaldehyde (62.5 g, 0.325 mole) was heated to 180° C. with stirring for 6 hours, 30 minutes. It was cooled. The brown solid was taken up in dichloromethane and extracted with 5% strength sodium hydroxide. The aqueous phase was acidified with 3N hydrochloric acid. The solid obtained was filtered off and recrystallized in an ethanol/water mixture (40/60). 3-Allyl-4-hydroxy-5-methoxybenzaldehyde was obtained (light beige powder, 62.5 g, yield=71%, melting point=83°-84° C.).

Second stage

The above derivative (34 g, 0.18 mol), dimethylformamide (500 ml), potassium carbonate (49 g, 0.35 mol) and methyl iodide (50 g, 0.35 mol) were introduced in succession into a reactor. They were maintained at a temperature of 40° C. for 3 hours. The reaction mixture was dropped into iced water and the oil formed was extracted with dichloromethane. After washing, drying and evaporating off the solvent, a light brown oil was obtained, which was passed through a bed of silica 60 to give a pale yellow oil of 3-allyl-4,5-dimethoxybenzaldehyde (34.3 g, yield=92%).

Third stage

A mixture of the preceding derivative (15 g, 0.073 mol), of diethyl malonate (11.7 g, 0.073 mol), of toluene (18 ml), of acetic acid (0.46 ml) and of piperidine (0.87 ml) was heated for 7 hours at reflux with a Dean Stark. After cooling, the toluene phase was washed with water, was dried and the solvent was distilled off. The pale orange oil obtained (24.5 g, yield=96%) was crystallized from a 50/50 diisopropyl ether/hexane mixture to give white crystals of diethyl 3-allyl-4,5-dimethoxybenzalmalonate (14.2 g, yield=56%) which had the following characteristics:

(i) melting point: 43°-44° C.,
(ii) $^1$H NMR spectrum (CDCl$_3$): spectrum consistent with the expected formula,
(iii) UV spectrum (CHCl$_3$): λ max=303 nm; $\epsilon$=15,700; λ max=325 nm; $\epsilon$=12,830 (shoulder);
(iv) elemental analysis: calculated: C 65.50, H 6.94, O 27.55; found: C 65.33, H 6.91, O 27.78

Example 7b

Preparation of the random polymer of the formula

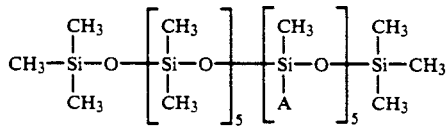

wherein A is the radical:

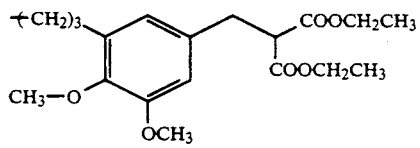

A toluene (30 ml) solution of diethyl 3-allyl-4,5-dimethoxybenzalmalonate (10 g, 28.7 meq) and of the random polymer of the above formula where A was a hydrogen atom (4.55 g, 28 meq as SiH) was added dropwise, under nitrogen and with stirring, over one hour, thirty minutes, to a suspension of platinum on charcoal at a concentration of 5% (106 mg) in dry toluene (5 ml) at 90°-100° C., while the temperature was maintained between 100° and 105° C. Stirring and refluxing were continued until the SiH groups had disappeared (absence of band at 2,180 cm$^{-1}$ in the infrared), namely, 12 hours. The mixture was filtered through paper, the solvent was removed and the residue was washed twice with 80% ethanol. The pale yellow oil obtained was taken up in dichloromethane, was dried over sodium sulfate and was passed through a bed of silica 60. After evaporation of the solvent, a viscous pale yellow oil was obtained (10.6 g, yield=73%).

(i) $^1$H NMR spectrum (CDCl$_3$): spectrum consistent with the formula,
(ii) $^{29}$Si NMR spectrum (CDCl$_3$): spectrum consistent with the formula,
(iii) UV spectrum (CHCl$_3$): λ max: 304 nm.

EXAMPLE 8

Example 8a di-(2-ethylhexyl) 3-allyl-4,5-dimethoxybenzalmalonate

Preparation of a compound of the general formula (I) in which R$_1$ is the radical —CH$_2$—CH═CH$_2$, R$_2$ and R$_3$ are each the radical —OCH$_3$ and R$_5$ and R$_6$ are each the radical —CH$_2$CH(C$_2$H$_5$)C$_4$H$_9$.

A mixture of 3-allyl-4,5-dimethoxybenzaldehyde (10.3 g, 0.05 mole), of di-(2-ethylhexyl) malonate (16.4 g, 0.05 mole), of toluene (20 ml), of acetic acid (0.41 ml) and of piperidine (0.77 ml) was heated at reflux for 5 hours with a Dean Stark. After cooling, washing the toluene phase with water, drying and evaporating off the solvent, an orange-colored oil was obtained, which was purified by chromatography on a column of silica 60 (eluent: 90.10 heptane/ethyl acetate) to give di-(2-ethylhexyl) 3-allyl-4,5-dimethoxybenzalmalonate (colorless oil, 15 g, yield=64%) which had the following characteristics:

(i) $^1$H NMR spectrum (CDCl$_3$): spectrum consistent with the expected formula,
(ii) UV spectrum (CHCl$_3$): λ max=303 nm; $\epsilon$=15,500; λ max=320 nm; $\epsilon$=13,430 (shoulder);
(iii) elemental analysis: calculated: C 72.06, H 9.36, O 18.58 found: C 72.09, H 9.44, O 18.69.

Example 8b

Preparation of the random polymer of the formula

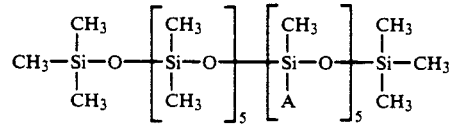

wherein A is the radical:

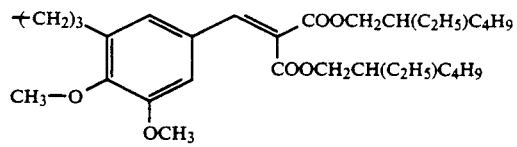

A toluene (30 ml) solution of di-(2-ethylhexyl) 3-allyl-4,5-dimethoxybenzalmalonate (10 g, 19.3 meq) and of the random polymer of the above formula where A was a hydrogen atom (2.86 g, 17.6 meq as SiH) was added dropwise, under nitrogen and with stirring, over one hour, thirty minutes, to a suspension of platinum on charcoal at a concentration of 5% (80 mg) in dry toluene (5 ml) at 90°-100° C., while the temperature was maintained between 100° and 105° C. Stirring and refluxing were continued until the SiH groups had disappeared (absence of band at 2,180 cm$^{-1}$ in the infrared), namely, 12 hours. The mixture was filtered through paper, the solvent was removed and the residue was washed twice with 80% ethanol. The pale yellow oil obtained was taken up in dichloromethane, was dried over sodium sulfate and was passed through a bed of silica 60. After evaporating off the solvent, a viscous pale yellow oil was obtained (5.1 g, yield=43%).

(i) $^1$H NMR spectrum (CDCl$_3$): spectrum consistent with the formula, (ii) $^{29}$Si NMR spectrum (CDCl$_3$): spectrum consistent with the formula, (iii) UV spectrum (CHCl$_3$): λ max: 305 nm.

EXAMPLE 9

Example 9a diethyl 3-allyl-4-butoxy-5-methoxybenzalmalonate

Preparation of a compound of general formula (I) in which R$_1$ is the radical —CH$_2$CH=CH$_2$, R$_2$ is the radical —OC$_4$H$_9$, R$_3$ is the radical —OCH$_3$ and R$_5$ and R$_6$ are each the radical —C$_2$H$_5$.

First stage

A mixture 3-allyl-4-hydroxy-5-methoxybenzaldehyde (10.25 g, 0.053 mole), of dimethylformamide (150 ml), of potassium carbonate (8.29 g, 0.06 mole) and of 1-bromobutane (8.22 g, 0.06 mole) was maintained at 40°-45° C. for 3 hours. The reaction mixture was dropped into iced water and the oil formed was extracted with dichloromethane. After washing with water, drying and evaporating off the solvent, a brown oil was obtained, which was passed through a bed of silica 60 to give a pale yellow oil of 3-allyl-4-butoxy-5-methoxybenzaldehyde (13 g, yield=91%).

Second stage

A mixture of the above derivative (10.2 g, 0.041 mole), of diethylmalonate (7 g, 0.041 mol), of toluene (12 ml), of acetic acid (0.26 ml) and of piperidine (0.49 ml) was heated at reflux for 7 hours with a Dean Stark. In the same manner as in Example 8a, diethyl 3-allyl-4-butoxy-5-methoxybenzalmalonate was obtained (colorless oil, 10 g, yield=67%), which had the following characteristics:

(i) $^1$H NMR spectrum (CDCl$_3$): spectrum consistent with the expected formula, (II) UV spectrum (CHCl$_3$): λ max=305 nm; ε=15,500; λ max=325 nm; ε=13,530 (shoulder);

(iii) elemental analysis: calculated: C 67.67, H 7.74, O 24.58; found: C 67.87, H 7.83, O 24.44.

Example 9b

Preparation of the random polymer of the formula

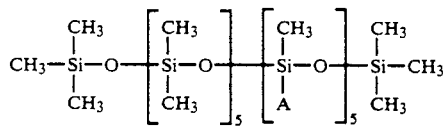

wherein A is the radical:

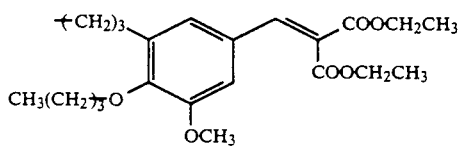

A toluene (20 ml) solution of diethyl 3-allyl-4-butoxy-5-methoxybenzalmalonate (8.2 g, 21 meq) and of the random polymer of the above formula where A was a hydrogen atom (3.24 g, 19.9 meq as SiH) was added dropwise, under nitrogen and with stirring, over one hour, thirty minutes, to a suspension of platinum on charcoal at a concentration of 5% (60 mg) in dry toluene (5 ml) at 90°-100° C., while the temperature was maintained between 100° and 105° C. Stirring and refluxing were continued until the SiH groups had disappeared (absence of band at 2,180 cm$^{-1}$ in the infrared), namely, 10 hours. The mixture was filtered through paper, the solvent was removed and the residue was washed twice with 80% ethanol. The pale yellow oil obtained was taken up in dichloromethane, was dried over sodium sulfate and passed through a bed of silica 60. After evaporating off the solvent a viscous colorless oil was obtained (4.7 g, yield=43%).

(i) $^1$H NMR spectrum (CDCl$_3$): spectrum consistent with the formula, (ii) $^{29}$Si NMR spectrum (CDCl$_3$): spectrum consistent with the formula, (iii) UV spectrum (CHCl$_3$): λ max: 306 nm : λ max: 325 nm.

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. A functional diorganopolysiloxane polymer having one of the following formulae (1) or (2):

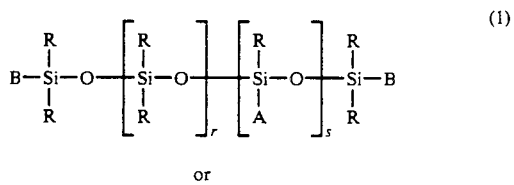

or

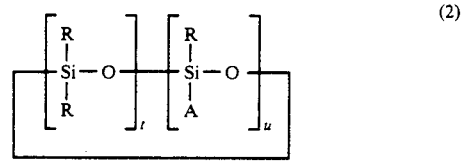

in which the radicals R, which may be identical or different, are each a C$_1$-C$_{10}$ alkyl, phenyl or 3,3,3-trifluoropropyl radical, at 80% of the number of the R radicals being methyl radicals; the radicals B, which may be identical or different, are each a radical R or a radical A; r is an integer ranging from 0 to 200; s is an integer ranging from 0 to 50, with the proviso that if s is 0, at least one of the two radicals B is an A radical; u is an integer ranging from 1 to 20; t is an integer ranging from 0 to 20; t+u is equal to or greater than 3; and A is a radical of the formula:

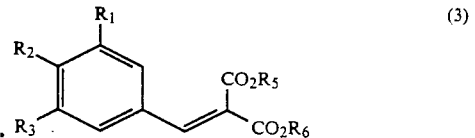

wherein R$_1$ and R$_2$ are each a hydrogen atom, a hydroxyl radical, a trimethylsiloxy radical, a C$_1$-C$_6$ alkyl radical, a C$_1$-C$_6$ alkoxy radical or a divalent radical Y of the formula:

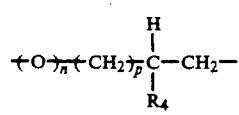

in which n is 0 or 1; p is an integer ranging from 1 to 10; and $R_4$ is a hydrogen atom or a $C_1$-$C_4$ alkyl radical, with the proviso that one of the two radicals $R_1$ and $R_2$ necessarily is the radical Y; $R_3$ is a hydrogen atom, a $C_1$-$C_6$ alkyl radical or a $C_1$-$C_6$ alkoxy radical; and $R_5$ and $R_6$, which may be identical or different, are each a $C_1$-$C_8$ alkyl radical.

2. The functional diorganopolysiloxane as defined by claim 1, having the formula (1).

3. The functional diorganopolysiloxane as defined by claim 1, having the formula (2).

4. The functional diorganopolysiloxane as defined by claim 1, wherein at least one of the radicals is defined as follows:

R is methyl;
B is methyl;
$R_1$ is H or Y;
$R_2$ is Y, methoxy or butoxy;
$R_3$ is H or methoxy;
p = 1;
$R_4$ is H or methyl;
$R_5$ and $R_6$ are each ethyl or 2-ethylhexyl;
r ranges from 5 to 20;
s ranges from 2 to 15;
t+u ranges from 3 to 10.

5. A process for the preparation of the functional diorganopolysiloxane as defined by claim 2, comprising hydrosilylating, in the presence of a catalytically effective amount of a platinum catalyst, an SiH polymer of the formula:

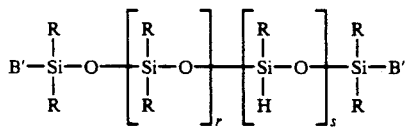

in which the radicals B', which may be identical or different, are each a radical R or a hydrogen atom, with an organic benzalmalonate of the formula:

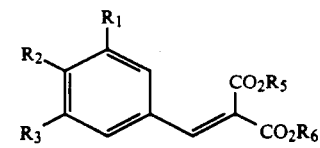

in which the radical Y is a monovalent unsaturated radical Y' of the formula:

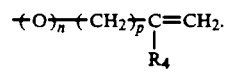

6. A process for the preparation of the functional diorganopolysiloxane as defined by claim 3, comprising hydrosilylating, in the presence of a catalytically effective amount of a platinum catalyst, an SiH polymer of the formula:

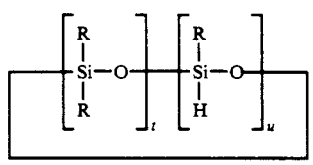

with an organic benzalmalonate of the formula:

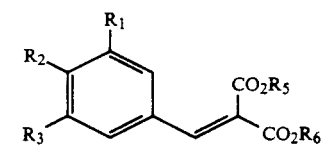

in which the radical Y is a monovalent unsaturated radical Y' of the formula

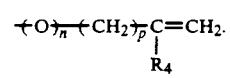

7. A coating composition comprising the functional diorganopolysiloxane as defined by claim 1.

8. An optical fiber coated with the composition as defined by claim 7.

9. A plastic substrate comprising a lubricating amount of the functional diorganopolysiloxane as defined by claim 1.

10. The substrate as defined by claim 9, said plastic comprising polyvinylchloride.

* * * * *